(12) United States Patent
Wurtenberger et al.

(10) Patent No.: US 8,599,152 B1
(45) Date of Patent: Dec. 3, 2013

(54) INTELLIGENT TOUCH SCREEN KEYBOARD

(75) Inventors: Andrew Mark Wurtenberger, Olathe, KS (US); Clark Douglas Halferty, Lee's Summit, MO (US); Caleb Sisson Hyde, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 684 days.

(21) Appl. No.: 12/823,276

(22) Filed: Jun. 25, 2010

(51) Int. Cl.
*G06F 3/041* (2006.01)
(52) U.S. Cl.
USPC .......................................... 345/173; 345/168
(58) Field of Classification Search
None
See application file for complete search history.

(56) References Cited

U.S. PATENT DOCUMENTS

| 2007/0236474 A1* | 10/2007 | Ramstein | 345/173 |
| 2010/0073329 A1* | 3/2010 | Raman et al. | 345/177 |
| 2010/0090963 A1* | 4/2010 | Dubs et al. | 345/173 |
| 2010/0149134 A1* | 6/2010 | Westerman et al. | 345/179 |
| 2010/0253652 A1* | 10/2010 | Homma et al. | 345/177 |
| 2011/0201387 A1* | 8/2011 | Paek et al. | 455/566 |

* cited by examiner

*Primary Examiner* — Adam R Giesy

(57) ABSTRACT

Methods, systems, and computer-readable media are provided for orienting a keyboard layout onto a touch screen of a computing device. In particular, the keyboard layout is received at the computing device. Based on the keyboard layout, at least one anchor key is identified. The at least one anchor key is associated with haptic feedback. Further, the haptic feedback associated with the at least one anchor key is presented on the keyboard layout on the touch screen of the computing device.

15 Claims, 14 Drawing Sheets

INTELLIGENT TOUCH SCREEN KEYBOARD

SUMMARY

Embodiments of the invention are defined by the claims below, not this summary. A high-level overview of various aspects of the invention are provided here for that reason, to provide an overview of the disclosure, and to introduce a selection of concepts that are further described below in the Detailed Description section. This summary is not intended to identify key features or essential features of the claimed subject matter, nor is it intended to be used as an aid in isolation to determine the scope of the claimed subject matter.

As touch screens have become increasingly popular, many users have become accustomed to using touch screens to compose messages and documents. In particular, users have become accustomed to using a keyboard layout on a touch screen of a computing device. However, the keys of a keyboard layout on a touch screen lack the sensory distinctiveness of keys of traditional keyboards. As such, it is difficult for many users to type on a keyboard layout on a touch screen of a computing device without looking at the keyboard layout. It would be beneficial for a user to be able to compose messages and documents using a keyboard layout on a touch screen without having to look at the keyboard layout. Accordingly, embodiments of the present invention provide sensory feedback, such as haptic feedback, to orient a user to a keyboard layout on a touch screen of a computing device.

In a first aspect, a set of computer-useable instructions provides a method of orienting a keyboard layout onto a touch screen of a computing device. The method includes receiving the keyboard layout at the computing device. Additionally, at least one anchor key of the keyboard layout is identified. The at least one anchor key is associated with haptic feedback. Further, the haptic feedback associated with the at least one anchor key is presented on the keyboard layout on the touch screen of the computing device.

In a second aspect, a set of computer-useable instructions provides a method of orienting a keyboard layout onto a touch screen of a computing device. The method includes receiving the keyboard layout at the computing device. A set of anchor keys is identified within the keyboard layout. The set of anchor keys is within the same row of the keyboard layout. Further, each anchor key of the set of anchor keys is associated with haptic feedback based on the distance of each key from a center of the keyboard layout. The keyboard layout is presented on the touch screen of the computing device. The haptic feedback associated with the set of anchor keys is presented on the keyboard layout on the touch screen of the computing device.

In a third aspect, a set of computer-useable instructions provides a method of orienting a keyboard layout onto a touch screen of a computing device. The method includes receiving the keyboard layout at the computing device. A set of anchor keys is identified within the keyboard layout. The set of anchor keys is within the same row of the keyboard layout. Additionally, the set of anchor keys includes at least one primary anchor key and at least one secondary anchor key. Each primary anchor key of the set of anchor keys is associated with a first category of haptic feedback. Additionally, each secondary anchor key of the set of anchor keys is associated with a second category of haptic feedback. Further, the first and second categories of haptic feedback associated with the set of anchor keys are presented on the keyboard layout on the touch screen of the computing device.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
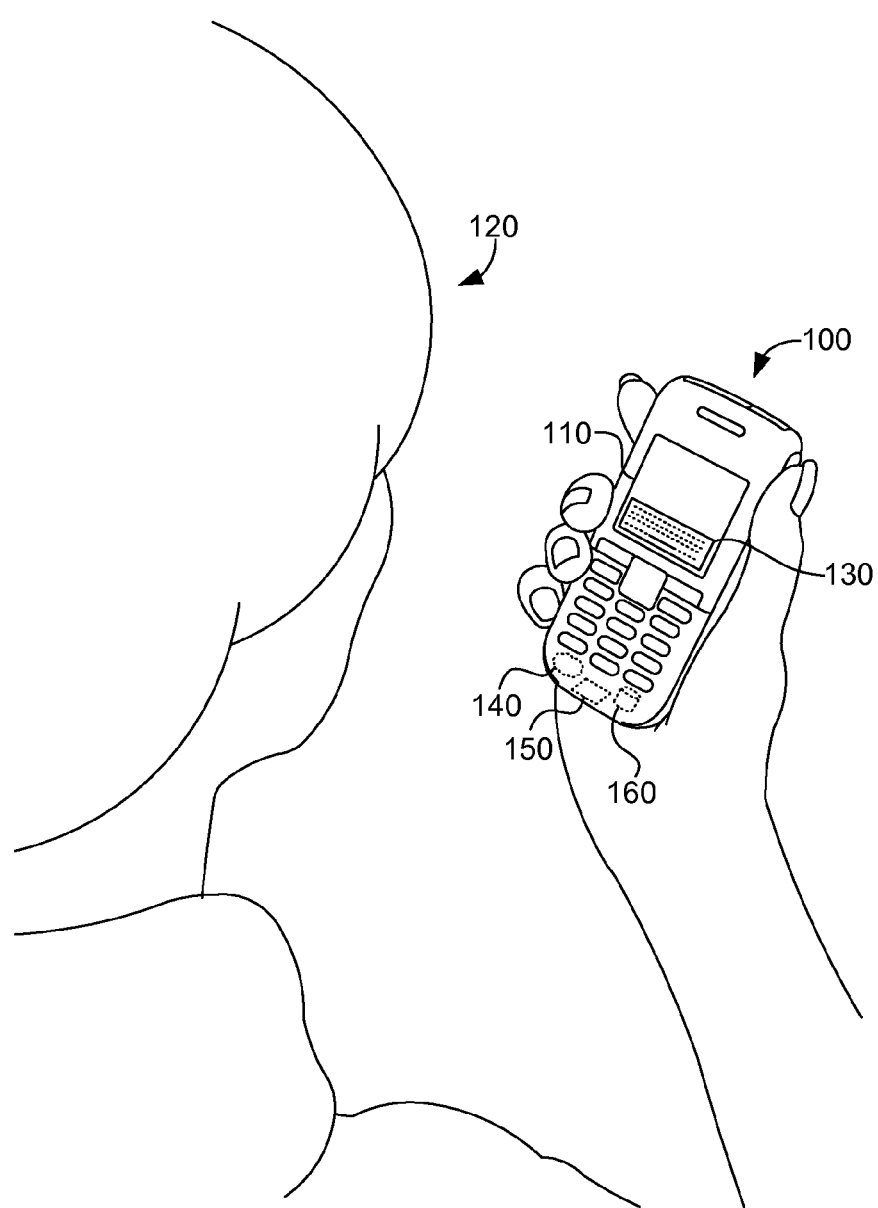
FIG. 1 depicts an illustrative mobile device in accordance with an embodiment of the present invention.

The subject matter of embodiments of the present invention is described with specificity herein to meet statutory requirements. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

| | |
|---|---|
| CD | Compact Disc |
| CD-ROM | Compact Disk Read Only Memory |
| DVD | Digital Versatile Discs |
| EEPROM | Electrically Erasable Programmable Read Only Memory |
| MP3 | MPEG-1 Audio Layer 3 |
| PC | Personal Computer |
| PDA | Personal Digital Assistant |
| RAM | Random Access Memory |
| ROM | Read Only Memory |

Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media include media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Embodiments of the present invention provide systems, methods, and computer-readable media for orienting a keyboard layout onto a touch screen of a computing device. In particular, a plurality of keys within the keyboard layout are identified as positional markers that are used to recognize the orientation of the keyboard layout. The keys that are identified as positional markers are designated as "anchor" keys. The anchor keys are identifiable to a user through the use of haptic feedback. In particular, haptic feedback is provided to the user in response to the user interacting with an anchor key. Accordingly, haptic feedback may be used to orient the keyboard layout on the touch screen of the mobile device.

Haptic feedback is transmitted to the user by the generation of pulses, vibrations, or other motions at a user interface, such as the touch screen of the computing device. Haptic feedback is generated at a haptic interface, which may include computer-executable instructions that are embedded on a computing device, such as a mobile device, and executed by an application program. In one example, haptic feedback is generated in response to receiving an indication that the user has interacted with an anchor key of the keyboard layout presented on the touch screen of the computing device. The haptic feedback may be transmitted to the touch screen of the computing device such that the user feels that the anchor key is vibrating when it is touched by the user. In embodiments discussed further below, the vibrations may be provided at the center of the anchor key, may be provided at the border or borders of the anchor key, or both.

As discussed above, haptic feedback may be used to orient anchor keys of the keyboard layout presented at the touch screen of the mobile device. Additionally, haptic feedback may be used to orient auxiliary keys of the keyboard layout presented on the touch screen of the mobile device. Auxiliary keys are keys of a keyboard that surround and are associated with anchor keys. In particular, touch sensors may be used in conjunction with the haptic interface to recognize when a user who is typing has disengaged an anchor key. In response to the recognition of the disengaged anchor key, the haptic interface may generate haptic feedback that is provided to keys surrounding the disengaged anchor key in anticipation of the user attempting to hit one of the auxiliary keys.

The position of anchor keys on the touch screen of the computing device may be selected by the user of the computing device. For instance, if a user has a preference of typing on the upper part of the touch screen of the computing device, the user may select the location of an anchor key to be near the top of the touch screen of the computing device. In response, the orientation of the keyboard layout on the touch screen may be adjusted to accommodate the selected location of the anchor key. Similarly, if a user prefers to type with his computing device at a 45-degree angle, the user may set an anchor key to be skewed at a 45-degree angle to accommodate the angled computing device. Accordingly, the remainder of the keyboard layout may be set to accommodate the placement of the anchor key.

Additionally, the selection of the position of two or more anchor keys by the user may be used to calibrate the placement of the remaining keys of the keyboard layout on the touch screen of the computing device. For instance, if a user has fingers that are wider than the width of a standardized keyboard layout, the user may select anchor keys in a range that would accommodate the hand size of the user. Further, the user may also select the particular keys of a keyboard layout that are defined as anchor keys. For example, the user may select the escape key, "Esc," as an anchor key.

Turning now to FIG. 1, an illustrative mobile device is provided in accordance with an embodiment of the present invention and referenced by the numeral 100. For brevity or as a shorthand form, this description might refer to a "device" instead of a "mobile device." This shorthand does not mean to imply a distinction with the different terms. In addition, a mobile device may refer to a number of different devices such as a cell phone or a personal digital assistant (PDA). This description does not intend to convey bright-line distinctions between the different types of mobile devices. Indeed, what one might refer to as a PDA, another might refer to as a mobile device or cell phone or even a PC.

Mobile device 100 may include a user interface 110, a user 120, a keyboard layout 130, application 140, memory 150, and data structure 160. Generally, user interface 110 and keyboard layout 130 provide an input/output (I/O) interface that user 120 may engage to interact with device 100. For example, user interface 110 may include a touch screen that a user may scratch or touch to interact with device 100. This interaction may include typing a message using keyboard layout 130.

Mobile device 100 can be any computing device. In embodiments, mobile device 100 may be capable of web accessibility. Device 100 might take on a variety of forms, such as a personal computer (PC), a laptop computer, a mobile phone, a CD player, an MP3 player, a video player, a handheld communications device, a workstation, any combination of these devices, or any other mobile device, including a device that is capable of web accessibility. In one embodiment, device 100 is a mobile device that utilizes a wireless telecommunications network to communicate. Manufacturers of illustrative mobile devices include, for example, Research in Motion® of Waterloo, Canada; Creative Technologies Corp. of Brooklyn, N.Y.; Samsung® of Seoul, Korea; Nokia® of Espoo, Finland; LG® of Seoul, Korea; Motorola® of Schaumburg, Ill.; and Apple® Computer of Cupertino, Calif. A mobile device can include, for example, a display, a processor, a power source (e.g., a battery), a data store, a speaker, memory, and a buffer.

Device 100 may also include application 140, memory 150, and data structure 160. Application 140 may carry out various functional aspects and might take on a variety of forms. For example, application 140 might include configuration settings, might facilitate communicating data between multiple devices, might handle updates, include user settings, etc. Specifically, application 140 may be used to implement a method for orienting a keyboard layout 130 presented on user interface 110 of mobile device 100. For example, application 140 may use computer software to identify anchor keys and provide haptic feedback in association with keyboard layout 130.

Memory 150 may include a data structure 160 that stores and facilitates the operation of application 140. For example, memory 150 may store data relating to a key and/or information displayed in association with keyboard layout 130 presented on user interface 110, as well as information related to haptic feedback associated with keyboard layout 130. In addition, memory 150 may store firmware and other various software modules and components that might be present in mobile device 100. These modules and components may be used in embodiments of the present invention to orient keyboard layout 130 presented on user interface 110 of mobile device 100. Other examples of illustrative software include things such as the operating system of a phone, third-party applications such as games, programs to watch television on the device, ring tones, location-based services, contact information, and the like. In sum, FIG. 1 is not meant to indicate all systems or components of mobile device 100. An overview of mobile device 100 is presented and certain components are listed so as to be able to refer to them throughout this disclosure.

Figure 2:
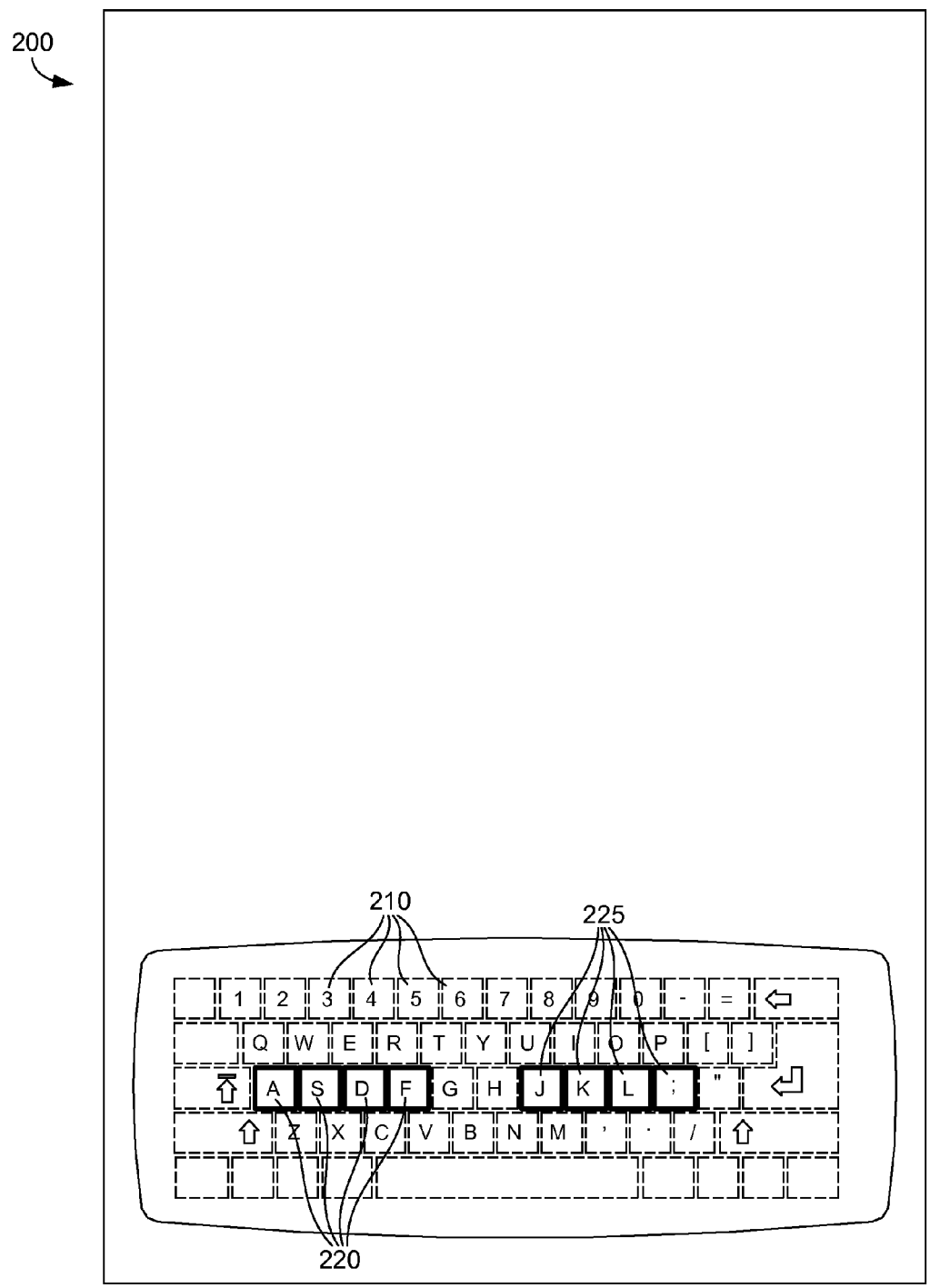
FIG. 2 depicts an illustrative keyboard layout that includes anchor keys with border-based emphasis haptic feedback in accordance with an embodiment of the present invention.

In order to orient a keyboard layout on a touch screen of a mobile device, certain areas of the keyboard are designated as anchor keys. For example, anchor keys may be associated with the home row keys of a keyboard. In American typing, home row keys are the keys of a keyboard upon which a typist's non-thumb digits rest in standard position. From the home row keys, all of the letters within the English alphabet are accessible. As an example of a QWERTY keyboard with identified anchor keys, FIG. 2 depicts an illustrative keyboard layout 200 that includes anchor keys with border-based emphasis haptic feedback in accordance with an embodiment of the present invention. In particular, FIG. 2 includes basic keys 210, where basic keys 210 are generic keys of the keyboard layout 200.

FIG. 2 also includes left-hand anchor keys 220 and right-hand anchor keys 225 of the keyboard layout 200. Left-hand anchor keys 220 are associated with the left hand of the typist and right-hand anchor keys 225 are associated with the right hand of the typist. Additionally, anchor keys 220 and 225 are enhanced with haptic feedback. In particular, the borders of anchor keys 220 and 225 are enhanced with haptic feedback. As discussed above, haptic feedback may be used to enhance anchor keys 220 and 225 by emitting pulses, vibrations, or other forms of haptic technology. The enhanced anchor keys 220 and 225 may be used to orient the keyboard layout 200 to the typist. In particular, the enhanced anchor keys 220 and 225 may serve as positional markers that allow the typist interacting with the keyboard layout 200 to determine the orientation of the keyboard layout 200.

Figure 3:
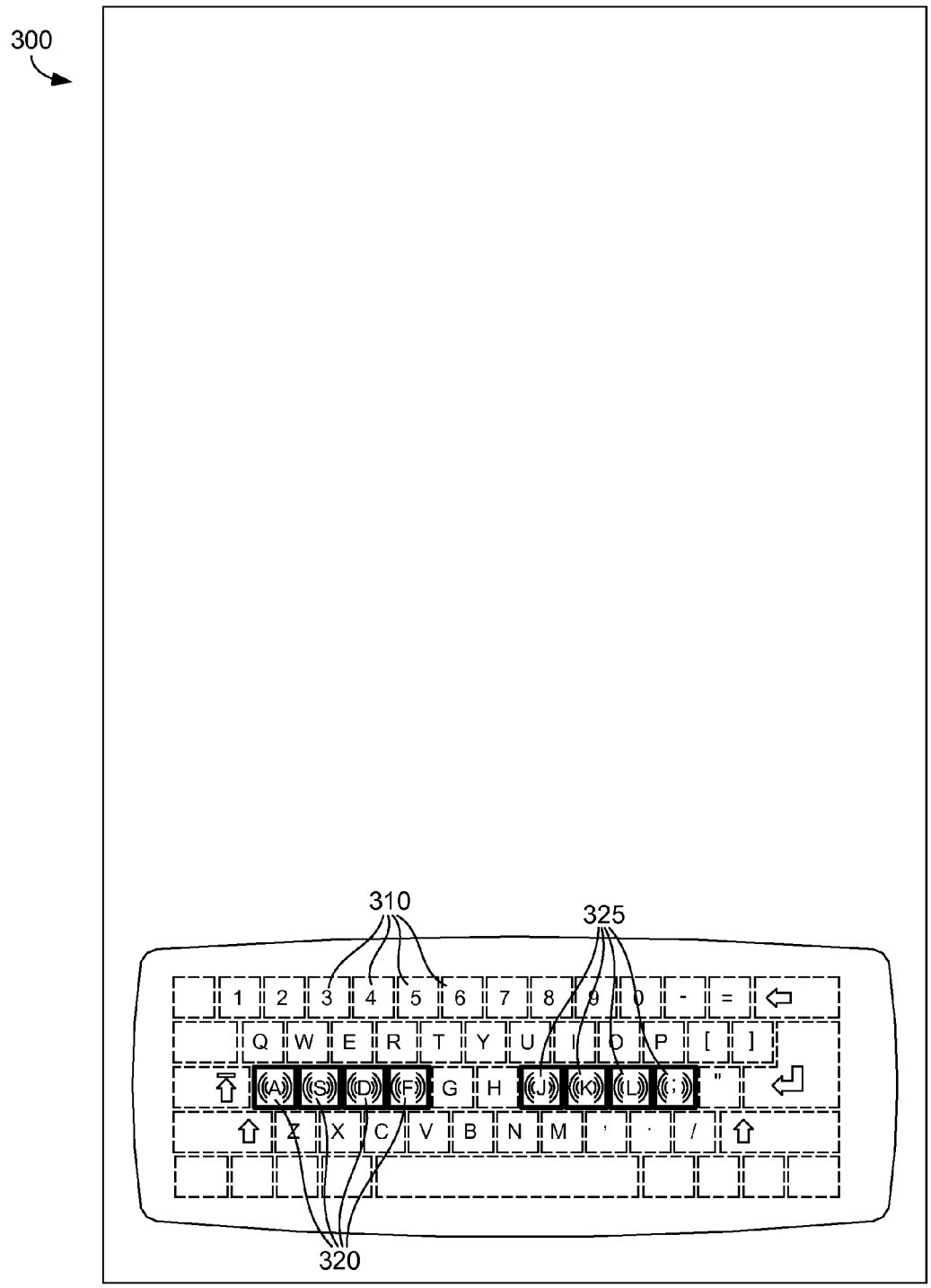
FIG. 3 depicts an illustrative keyboard layout that includes anchor keys with border-based and center-based emphasis haptic feedback in accordance with an embodiment of the present invention.

Alternatively, haptic feedback may be centered within anchor keys of the keyboard layout. Accordingly, FIG. 3 depicts an illustrative keyboard layout 300 that includes anchor keys with border-based and center-based emphasis haptic feedback in accordance with an embodiment of the present invention. In particular, FIG. 3 includes basic keys 310, left-hand anchor keys 320, and right-hand anchor keys 325. Additionally, haptic feedback may include vibrations, pulses, or both. Further, haptic feedback may vary in intensity, patterns, and response times. For example, haptic feedback may be varied based on categorization of keys of the keyboard layout on the touch screen of the mobile device.

Figure 4:
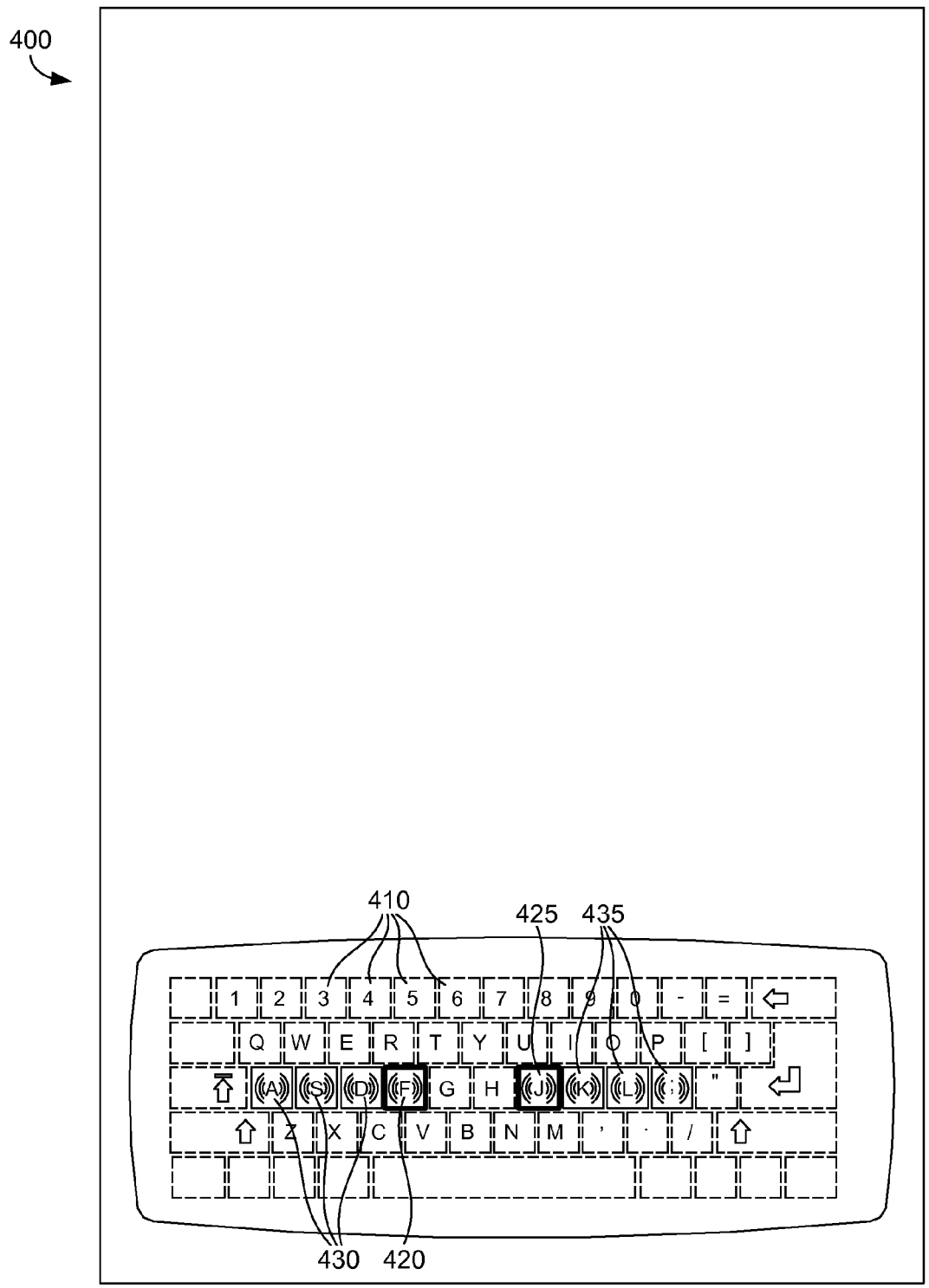
FIG. 4 depicts an illustrative keyboard layout that includes anchor keys with varying category-based emphasis haptic feedback in accordance with an embodiment of the present invention.

For example, anchor keys may be distinguished in order to better orient a user with the keyboard layout on the touch screen of the computing device. For example, anchors may be distinguished between primary anchor keys and secondary anchor keys. As such, FIG. 4 depicts an illustrative keyboard layout 400 that includes anchor keys with varying category-based emphasis haptic feedback in accordance with an embodiment of the present invention. In particular, FIG. 4 includes basic keys 410, left-hand anchor keys 420 and 430, and right-hand anchor keys 425 and 435. Left-hand anchor keys include a primary anchor key 420 and secondary anchor keys 430. Similarly, right-hand anchor keys include a primary anchor key 425 and secondary anchor keys 435. In FIG. 4, primary anchor keys 420 and 425 are associated with the index fingers of the left and right hand of the user, respectively. In alternative embodiments, primary anchor keys may be distinguished from secondary anchor keys based on preferences set by the user. For instance, the user may set the primary anchor keys to be the anchor keys farthest from the center of the keyboard layout.

Further, the primary anchor keys 420 and 425 are associated with haptic feedback that differs from the haptic feedback associated with the secondary keys 430 and 435. In particular, the haptic feedback associated with the primary anchor keys 420 and 425 includes border-based and center-based emphasis haptic feedback, while the haptic feedback associated with the secondary anchor keys 430 and 435 includes center-based emphasis haptic feedback. In this way, the distinction between primary and secondary anchor keys allows the distinction between left-hand anchor keys and right-hand anchor keys. Further, since the primary anchor key for the left-hand anchor keys and right-hand anchor keys are on the right and left, respectively, a user interacting with the keyboard layout is able to distinguish between the two sets of anchor keys.

Figure 5:
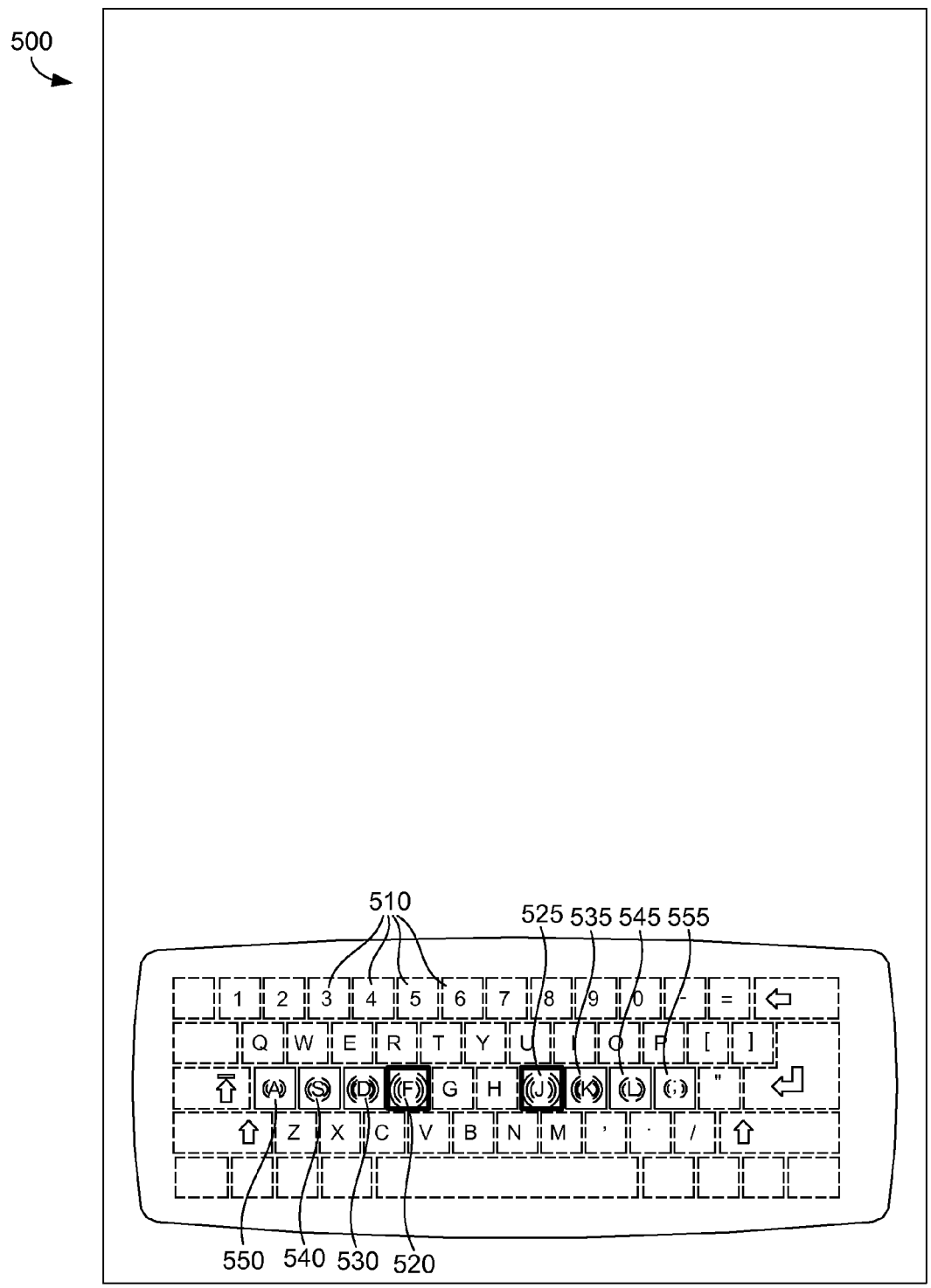
FIG. 5 depicts another illustrative keyboard layout that includes anchor keys with varying location-based and category-based emphasis haptic feedback in accordance with an embodiment of the present invention.

FIG. 5 depicts another illustrative keyboard layout that includes anchor keys with varying location-based and category-based emphasis haptic feedback in accordance with an embodiment of the present invention. FIG. 5 includes basic keys 510, a first set of left-hand anchor keys 520, 530, 540, and 550, and a second set of right-hand anchor keys 525, 535, 545, and 555. Left-hand anchor keys include a primary anchor key 520 and secondary anchor keys 530, 540, and 550. Similarly, right-hand anchor keys include a primary anchor key 525 and secondary anchor keys 535, 545, and 555. The primary anchor keys 520 and 525 are associated with the index fingers of the left and right hand, respectively. Further, the primary anchor keys 520 and 525 are associated with border-based and center-based emphasis haptic feedback, while the secondary anchor keys 530-555 are associated with center-based emphasis haptic feedback of varied degrees based upon the proximity of the secondary anchor keys 530-555 to each of the primary anchor keys 520 and 525 in the same set as each secondary anchor key, respectively. In this way, the distinction between primary and secondary anchor keys, as well as variance of center-based emphasis haptic feedback of secondary anchor keys 530-555 based upon the proximity of secondary anchor keys 530-555 to primary anchor keys 520 and 525, respectively, allows a user interacting with the keyboard layout to distinguish between the two sets of anchor keys.

Figure 6:
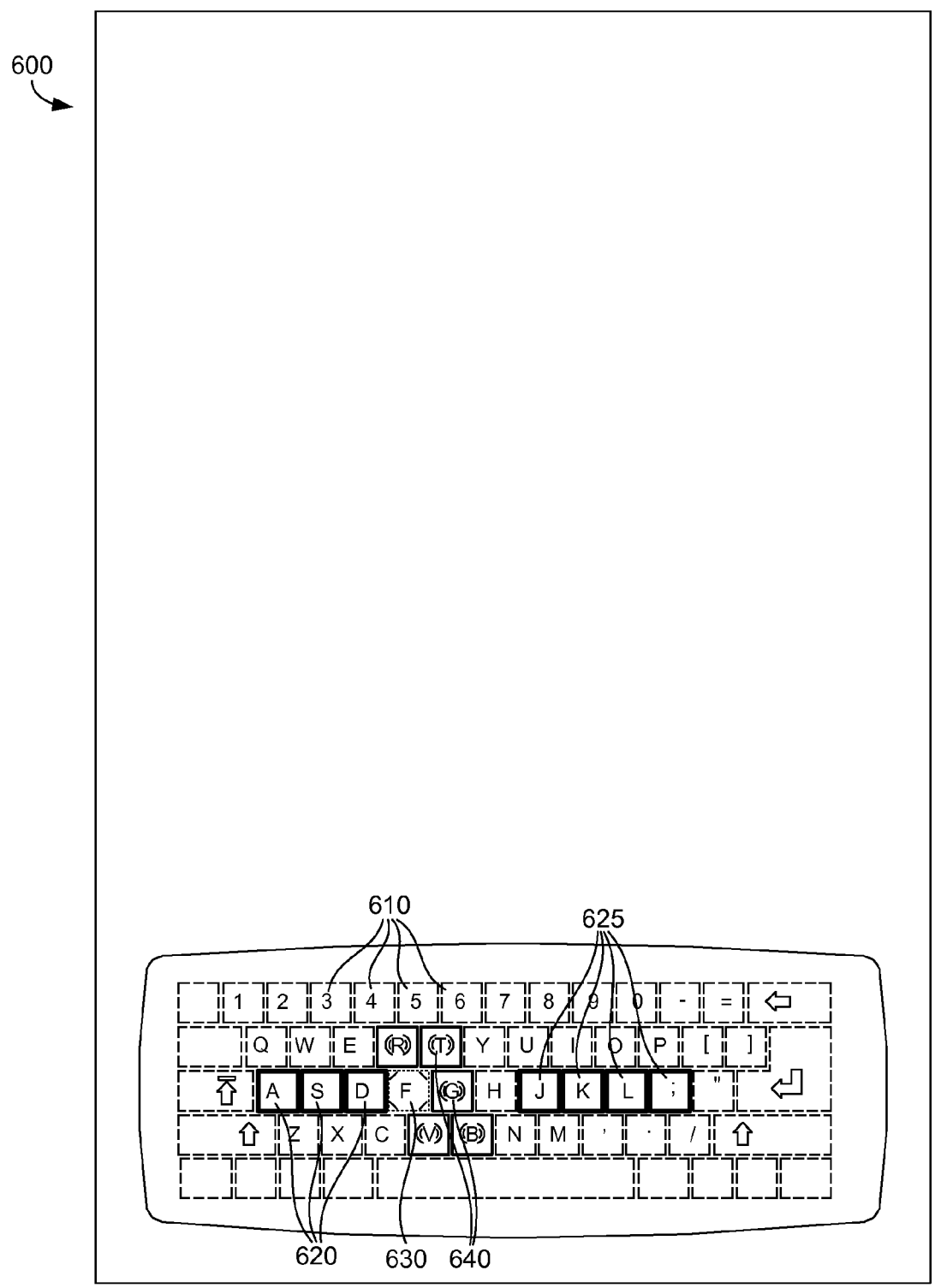
FIG. 6 depicts an illustrative keyboard layout that includes anchor keys with adaptive emphasis haptic feedback in accordance with an embodiment of the present invention.

As discussed above, touch sensors may be used in conjunction with the haptic interface to recognize when a typist has disengaged an anchor key. In response to the recognition of the disengaged anchor key, the haptic interface may generate haptic feedback provided to keys surrounding the disengaged anchor key when the surrounding keys are associated with the disengaged anchor key. Accordingly, FIG. 6 depicts an illustrative keyboard layout 600 that includes anchor keys with adaptive emphasis haptic feedback in accordance with an embodiment of the present invention. FIG. 6 includes basic keys 610, left-hand anchor keys 620 and 630, and right-hand anchor keys 625. In particular, when the mobile device senses that the "F" anchor key 630 is lifted in the QWERTY keyboard, the mobile device may present haptic feedback to the auxiliary keys 640. The auxiliary keys 640 shown in FIG. 6 are based on standard typing conventions associated with a QWERTY keyboard and include the "R," "T," "G," "B," and "V" keys that are auxiliary to the "F" anchor key 630 in anticipation of the typist attempting to hit one of those keys. In alternative embodiments, the auxiliary keys 640 may be set by the typist or may be customized to another typing convention. For example, some typists may use the left-hand index finger to type the letter "Y" when a conventional QWERTY keyboard layout is used.

Figure 7:
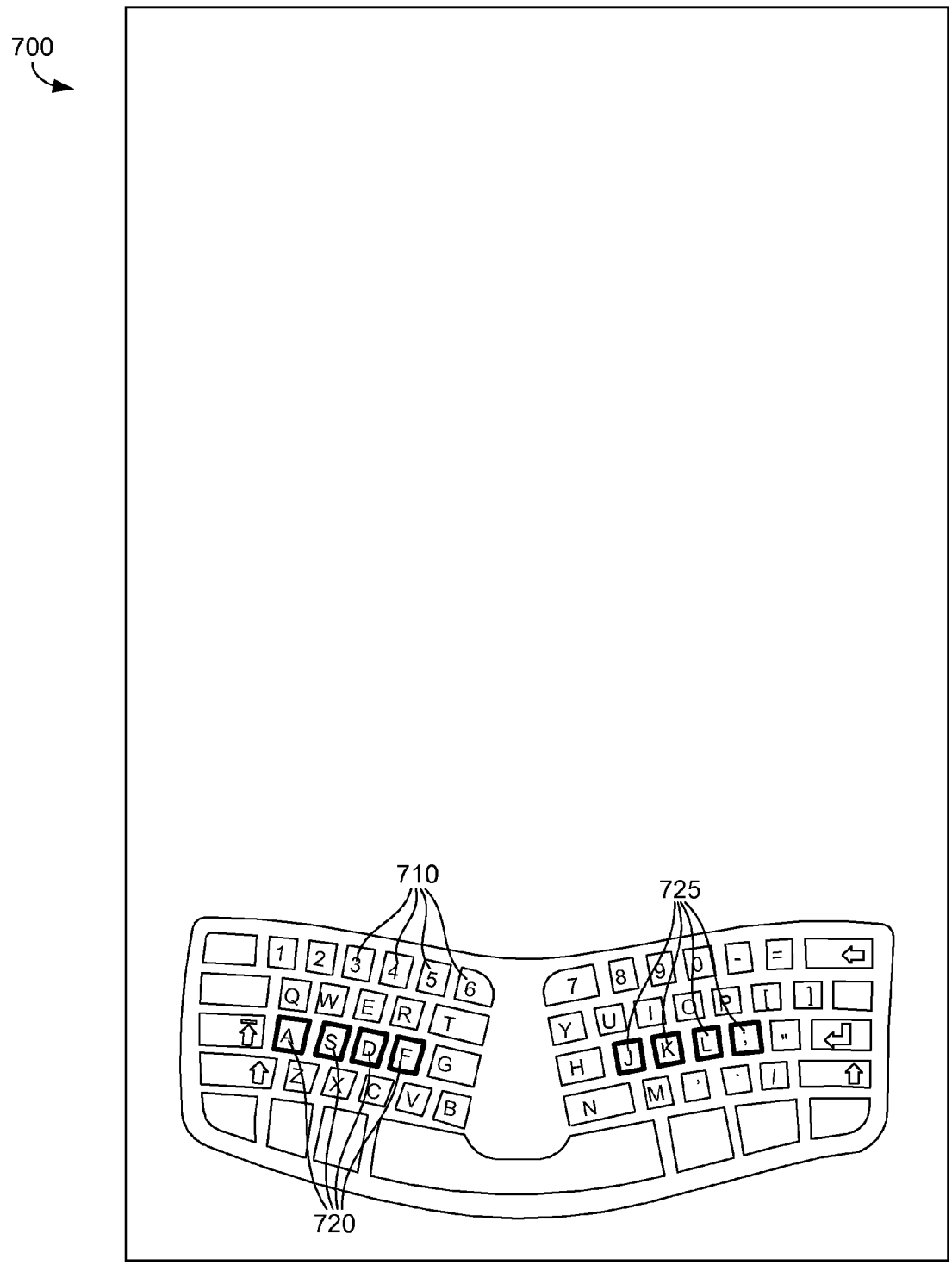
FIG. 7 depicts an illustrative ergonomic keyboard layout that includes anchor keys with border-based emphasis haptic feedback in accordance with an embodiment of the present invention.

In addition to the example above, alternative QWERTY keyboard layouts may be used in embodiments of the present invention. For example, FIG. 7 depicts an illustrative ergonomic keyboard layout 700 that includes anchor keys with border-based emphasis haptic feedback in accordance with an embodiment of the present invention. In accordance with the example above, the auxiliary keys associated with anchor keys of the ergonomic keyboard layout 700 may differ from the auxiliary keys of the standard QWERTY keyboard, such as the keyboard layout 600 seen in FIG. 6. Similar to FIG. 2, FIG. 7 includes basic keys 710, left-hand anchor keys 720 and right-hand anchor keys 725 of the keyboard layout 700. Additionally, anchor keys 720 and 725 are enhanced with haptic feedback. In particular, the borders of anchor keys 720 and 725 are enhanced with haptic feedback.

Figure 8:
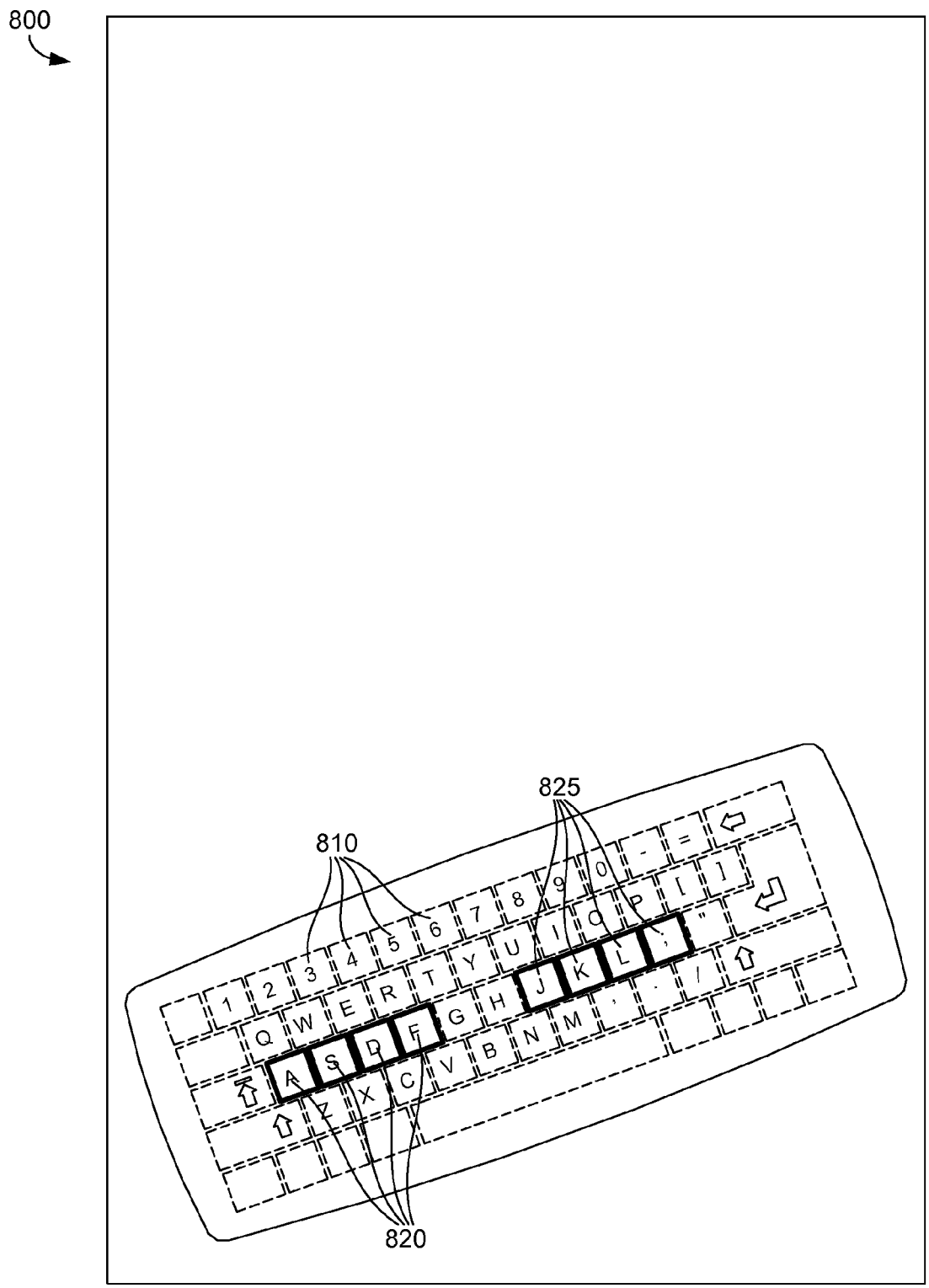
FIG. 8 depicts an illustrative alternative position of a keyboard layout that includes anchor keys with border-based emphasis haptic feedback in accordance with an embodiment of the present invention.

As discussed above, anchor keys may be used in conjunction with a touch sensor to set a keyboard layout on a touch screen of a computing device. In particular, a user may interact with the touch screen of the mobile device to indicate placement of one or more anchor keys. For instance, a user may indicate the desired placement of one or more anchor keys by interacting with the touch screen of the mobile device. FIG. 8 depicts an illustrative alternative position 800 of a keyboard layout that includes anchor keys with border-based emphasis haptic feedback in accordance with an embodiment of the present invention. In particular, FIG. 8 includes basic keys 810, left-hand anchor keys 820, and right-hand anchor keys 825, in accordance with embodiments of the present invention.

Figure 9:
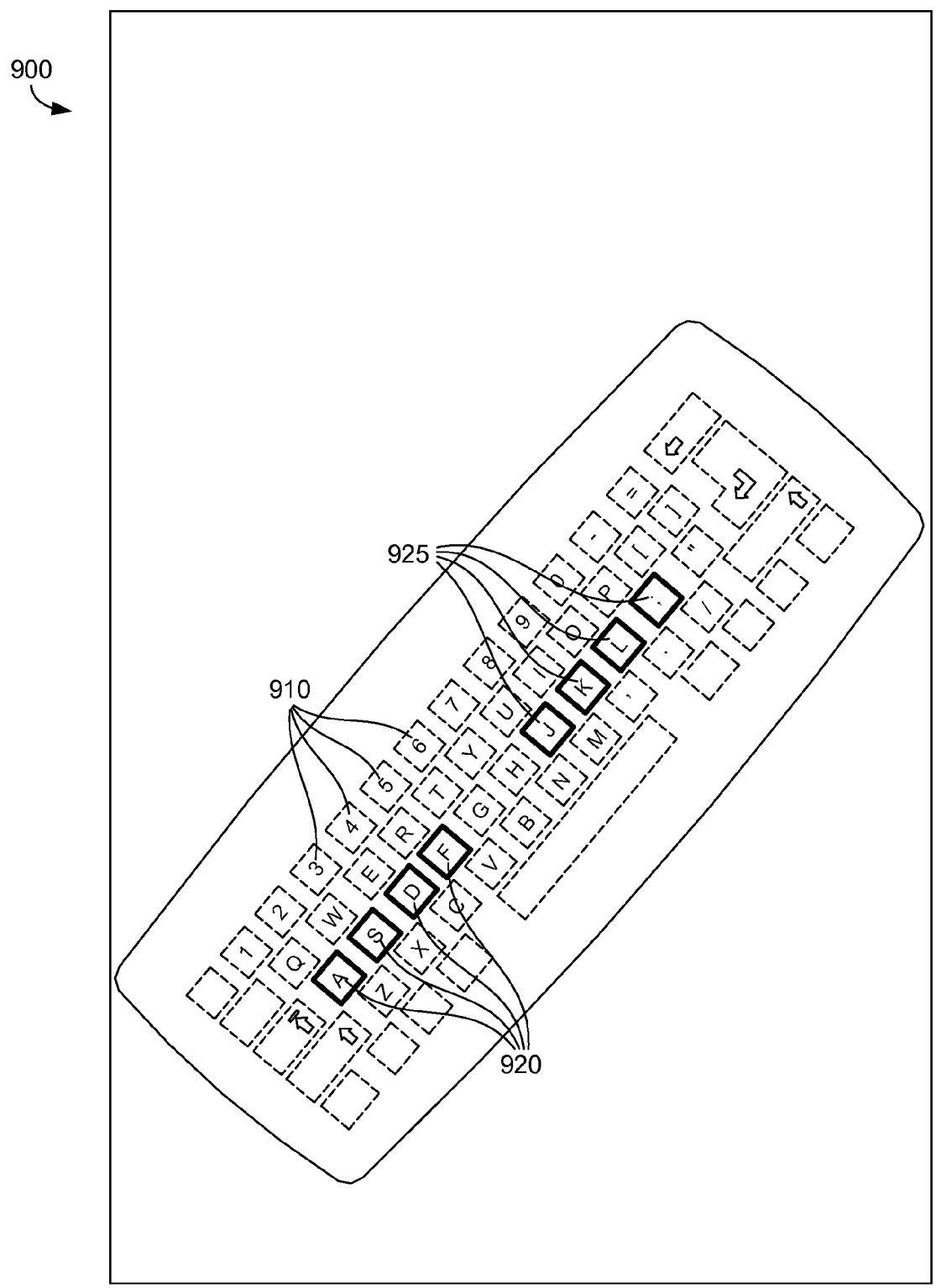
FIG. 9 depicts an illustrative alternative spacing of a keyboard layout that includes anchor keys with border-based emphasis haptic feedback in accordance with an embodiment of the present invention.

In addition to setting the placement of the keyboard layout on the touch screen of the computing device, a user may set placement of anchor keys to calibrate the spacing of keys of the keyboard layout. FIG. 9 depicts an illustrative alternative spacing 900 of a keyboard layout that includes anchor keys with border-based emphasis haptic feedback in accordance with an embodiment of the present invention. FIG. 9 includes basic keys 910, left-hand anchor keys 920, and right-hand anchor keys 925. In particular, the spacing 900 of the keys of the keyboard layout may be set by setting at least two anchor keys, then extrapolating the spacing between the keys of the keyboard layout based on the spacing between the two anchor keys.

Figure 10:
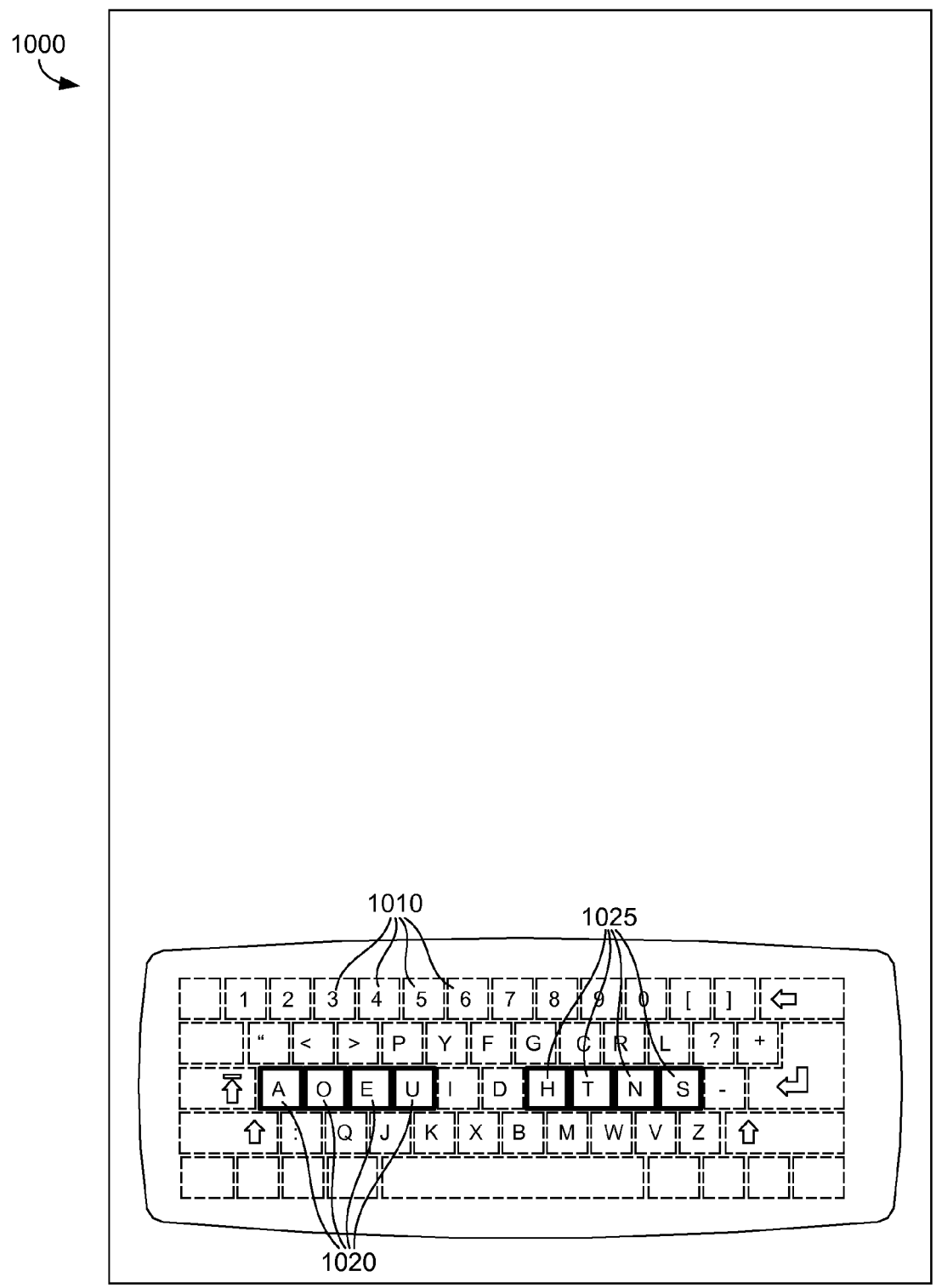
FIG. 10 depicts an illustrative alternative keyboard layout that includes anchor keys with border-based emphasis haptic feedback in accordance with an embodiment of the present invention.

While embodiments discussed above illustrate the use of a present invention on a QWERTY keyboard layout, other keyboard layouts may also be used in association with the present invention. For example, a DVORAK keyboard may also be used. As such, FIG. 10 depicts an illustrative alternative keyboard layout 1000 that includes anchor keys with border-based emphasis haptic feedback in accordance with an embodiment of the present invention. In particular, keyboard layout 1000 is consistent with a DVORAK keyboard. Similar to FIG. 2, the keyboard layout 1000 of FIG. 10 includes basic keys 1010, left-hand anchor keys 1020, and right-hand anchor keys 1025 of the keyboard layout 1000. Additionally, anchor keys 1020 and 1025 are enhanced with haptic feedback. In particular, the borders of anchor keys 1020 and 1025 are enhanced with haptic feedback.

Figure 11:
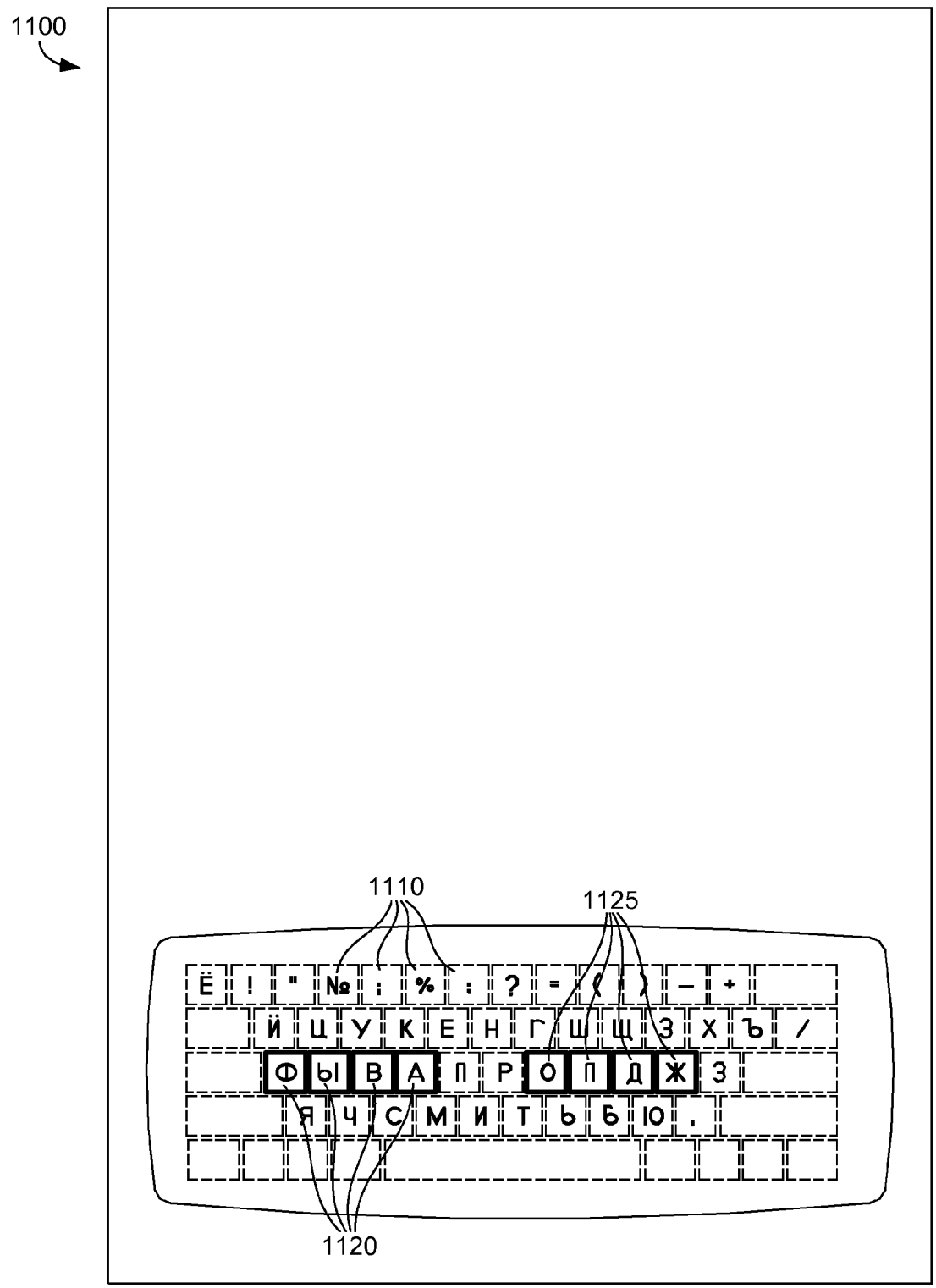
FIG. 11 depicts another illustrative alternative keyboard layout that includes anchor keys with border-based emphasis haptic feedback in accordance with an embodiment of the present invention.

Additionally, foreign keyboard layouts may also be used. FIG. 11 depicts another illustrative alternative keyboard layout 1100 that includes anchor keys with border-based emphasis haptic feedback in accordance with an embodiment of the present invention. In particular, FIG. 11 includes a keyboard layout 1100 having letters of the Cyrillic alphabet. Further, FIG. 11 includes basic keys 1110, left-hand anchor keys 1120, and right-hand anchor keys 1125 of the keyboard layout 1100. As discussed above, the selection of anchor keys provided in the illustrated embodiments does not necessarily reflect user or cultural preferences of keys that are regarded as positional markers within a keyboard. As such, the placement of a left- and right-hand on a Cyrilic keyboard may differ from the illustrated anchor keys as seen in keyboard layout 1100 of FIG. 11.

Figure 12:
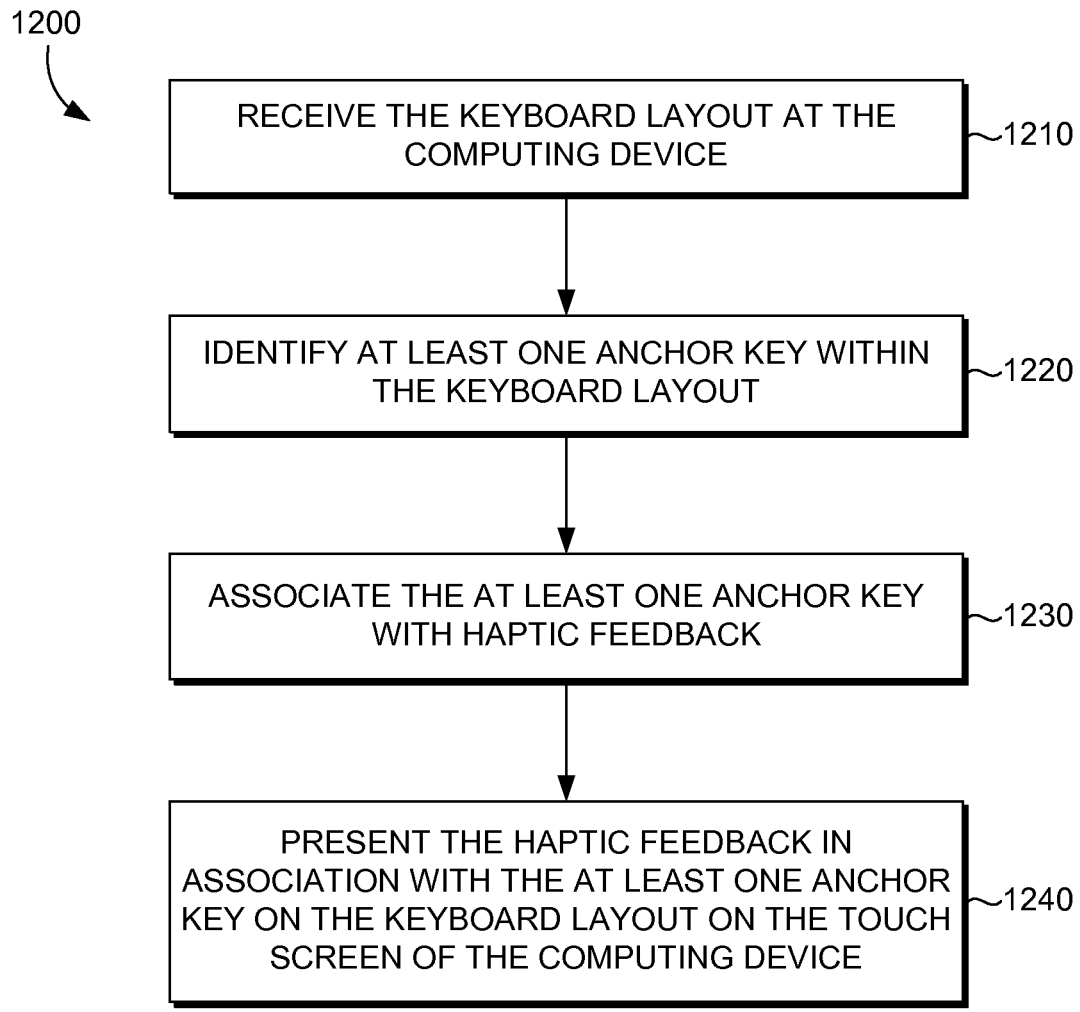
FIG. 12 is a flow diagram showing an embodiment of a method of orienting a keyboard layout onto a touch screen of a computing device, in accordance with an embodiment of the present invention.

FIG. 12 is a flow diagram 1200 showing an embodiment of a method of orienting a keyboard layout onto a touch screen of a computing device, in accordance with an embodiment of the present invention. At step 1210, the keyboard layout is received at the computing device. At step 1220, at least one anchor key is identified within the keyboard layout. The at least one anchor key may include a plurality of anchor keys. At step 1230, the at least one anchor key is associated with haptic feedback. The haptic feedback associated with each anchor key may be based on characteristics of each anchor key. For instance, an anchor key nearest to the center of the keyboard layout may have a varied intensity of haptic feedback relative to an anchor key farthest from the center of the keyboard layout. The haptic feedback associated with the at least one anchor key is presented at step 1240. In particular, the haptic feedback associated with the at least one anchor key may be presented on the keyboard layout on the touch screen of the computing device.

In embodiments, touch-based information of user engagements with the plurality of anchor keys may be received. Further, one key of the plurality of anchor keys may be recognized as being disengaged. In particular, an anchor key may be recognized as disengaged when a user ceases to interact with a portion of the touch screen that is associated with the disengaged anchor key. Further, the disengaged anchor key may be associated with a plurality of auxiliary keys. The auxiliary keys associated with the disengaged key may further be associated with haptic feedback. Additionally, the haptic feedback associated with the auxiliary keys may differ from the haptic feedback associated with the anchor keys. Accordingly, the presentation of the haptic feedback on the keyboard layout on the touch screen of the computing device may include the presentation of haptic feedback associated with the auxiliary keys.

Figure 13:
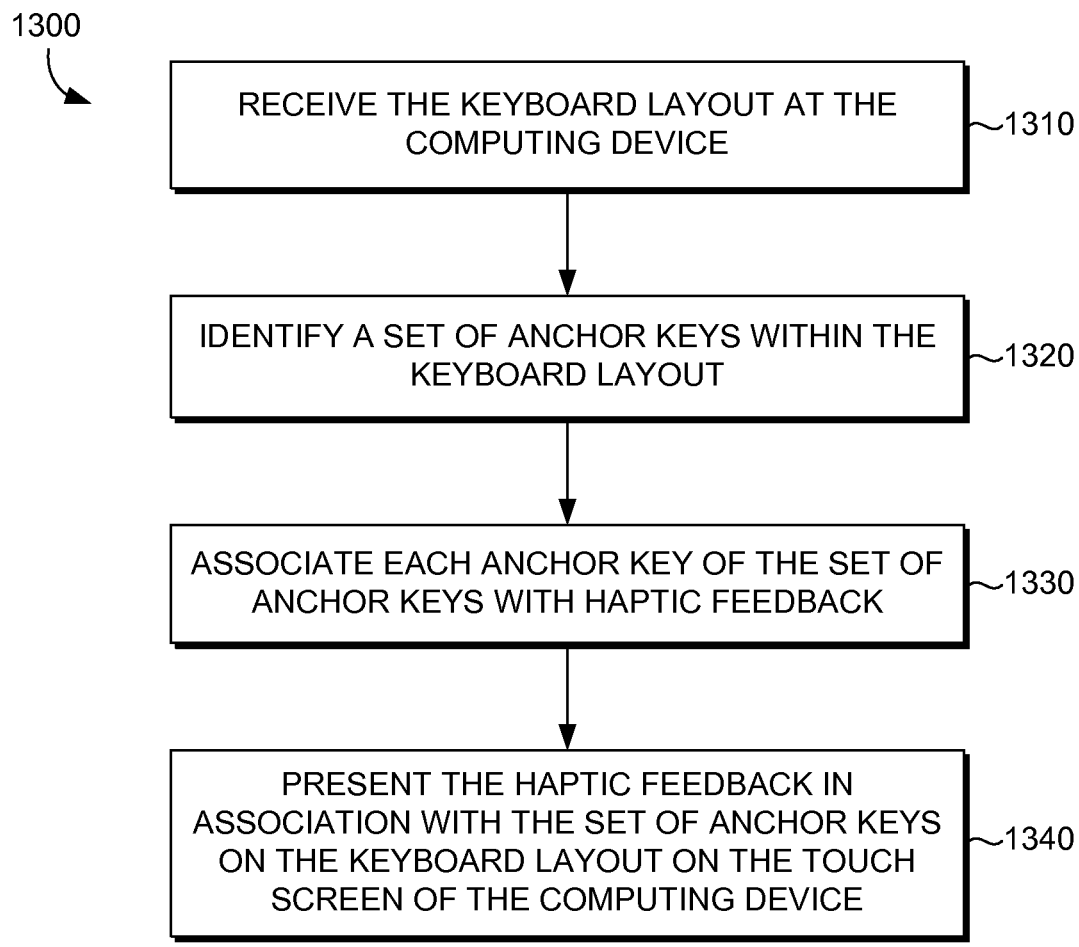
FIG. 13 is a flow diagram showing another embodiment of a method of orienting a keyboard layout onto a touch screen of a computing device, in accordance with an embodiment of the present invention.

FIG. 13 is a flow diagram 1300 showing another embodiment of a method of orienting a keyboard layout onto a touch screen of a computing device, in accordance with an embodiment of the present invention. At step 1310, the keyboard layout is received at the computing device. At step 1320, a set of anchor keys within the keyboard layout is identified. The set of anchor keys may be within the same row of the keyboard layout. Further, the set of anchor keys may be associated with the left-hand of a user, with the right-hand of a user, or both. At step 1330, each anchor key of the set of anchor keys is associated with haptic feedback. The haptic feedback associated with each anchor key may be based on the proximity of each key to a center of the keyboard layout. Further, the haptic feedback may be generated at a haptic interface. The haptic feedback may comprise pulses, vibrations, patterns of movement, intensity of feedback, or a combination thereof. For example, the intensity of the haptic feedback may be based on the proximity of an anchor key of the set of anchor keys to the center of the keyboard layout. Alternatively, the category of haptic feedback assigned to an anchor key of the set of anchor keys may be based on the proximity of the anchor key to the center of the keyboard layout.

At step 1340, the keyboard layout is presented on the touch screen of the computing device. In particular, the keyboard layout is presented with haptic feedback in association with the set of anchor keys. Additionally, the haptic feedback may comprise border-based emphasis haptic feedback of the anchor keys; center-based emphasis haptic feedback within the anchor keys; border-based emphasis haptic feedback of the auxiliary keys; center-based emphasis haptic feedback within the auxiliary keys; or a combination thereof. Further, the haptic feedback may be generated at a haptic interface. The haptic interface may be stored on the computing device.

Figure 14:
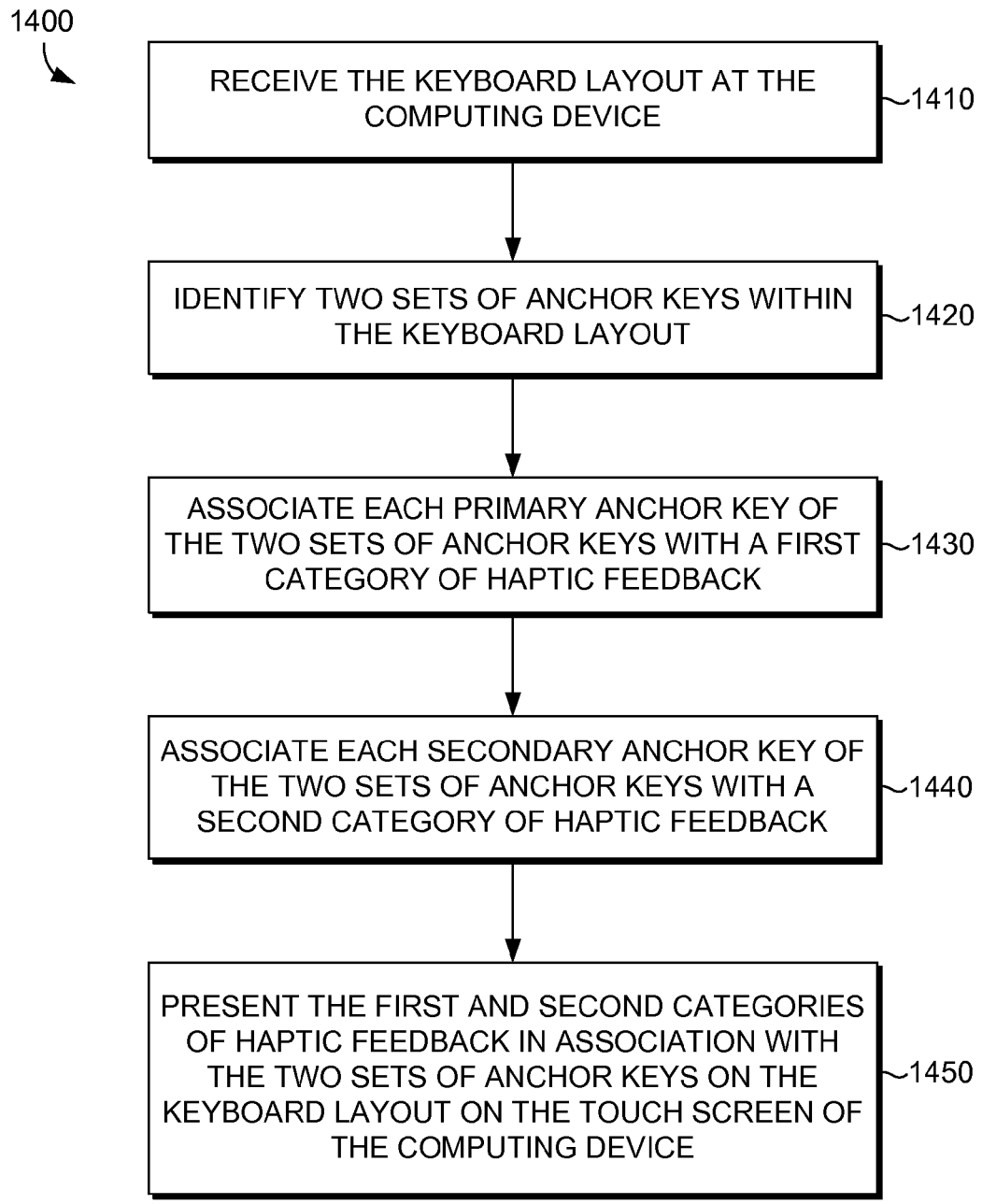
FIG. 14 is a flow diagram showing a further embodiment of a method of orienting a keyboard layout onto a touch screen of a computing device, in accordance with an embodiment of the present invention.

FIG. 14 is a flow diagram 1400 showing a further embodiment of a method of orienting a keyboard layout onto a touch screen of a computing device, in accordance with an embodiment of the present invention. At step 1410, the keyboard layout is received at the computing device. At step 1420, two sets of anchor keys within the keyboard layout are identified. Each set of the two sets of anchor keys is within the same row of the keyboard layout. Further, a first set of the two sets of anchor keys may be associated with the left-hand of a user, and a second set of the two sets of anchor keys may be associated with the right-hand of the user. Additionally, the two sets of anchor keys include at least one primary anchor key and at least one secondary anchor key. Further, each anchor key of the two sets of anchor keys may be one of a primary anchor key and a secondary anchor key.

At step 1430, each primary anchor key of the two sets of anchor keys is associated with a first category of haptic feedback. Each primary anchor key may be the anchor key of each set of anchor keys that is closest to the center of the keyboard. Similarly, at step 1440, each secondary anchor key of the two sets of anchor keys with a second category of haptic feedback. At step 1450, the first and second categories of haptic feedback are presented on the keyboard layout in association with the two sets of anchor keys.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A non-transitory computer-readable media having computer-executable instructions embodied thereon that, when executed, facilitate a method of orienting a keyboard layout onto a touch screen of a computing device, the method comprising:
    in the computing device, receiving the keyboard layout having a configuration comprising an initial plurality of anchor keys;
    in the computing device, receiving an user instruction to reconfigure the initial plurality of anchor keys to a subsequent plurality of anchor keys comprising different keys than the initial plurality of anchor keys;
    in the computing device, associating the subsequent plurality of anchor keys with a first haptic feedback; and
    presenting the first haptic feedback associated with the subsequent plurality of anchor keys on the keyboard layout on the touch screen of the computing device.

2. The computer-readable media of claim 1, further comprising:
    in the computing device, receiving an user instruction to configure a second subsequent plurality of anchor keys comprising different keys than the subsequent plurality of anchor keys.

3. The computer-readable media of claim 2, further comprising:
    in the computing device, associating the second subsequent plurality of anchor keys with a second haptic feedback; and
    presenting the second haptic feedback associated with the second subsequent plurality of anchor keys on the keyboard layout on the touch screen of the computing device.

4. The computer-readable media of claim 1, further comprising:
    in the computing device, associating a plurality of auxiliary keys with a third haptic feedback; and
    presenting the third haptic feedback associated with the plurality of auxiliary keys on the keyboard layout on the touch screen of the computing device.

5. The computer-readable media of claim 1, wherein the haptic feedback is presented as border-based emphasis of the anchor keys.

6. The computer-readable media of claim 1, wherein the haptic feedback is presented as center-based emphasis within the anchor keys.

7. The computer-readable media of claim 1, wherein the haptic feedback is generated at a haptic interface.

8. The computer-readable media of claim 1, wherein the subsequent plurality of anchor keys comprises keys within a same row of the keyboard layout.

9. The computer-readable media of claim 8, wherein a category of haptic feedback is assigned to an anchor key of the subsequent plurality of anchor keys based on the proximity of the anchor key to the center of the keyboard layout.

10. The computer-readable media of claim 1, wherein the first haptic feedback comprises pulses.

11. The computer-readable media of claim 1, wherein the first haptic feedback comprises vibrations.

12. A non-transitory computer-readable media having computer-executable instructions embodied thereon that, when executed, facilitate a method of orienting a keyboard layout onto a touch screen of a computing device, the method comprising:

in the computing device, receiving the keyboard layout;

in the computing device, receiving an user instruction to reconfigure an initial plurality of anchor keys to a first set of anchor keys and a second set of anchor keys, wherein the first and second sets of anchor keys comprise different keys than the initial plurality of anchor keys and further wherein the first set of anchor keys and the second set of anchor keys comprise at least one primary anchor key and at least one secondary anchor key;

in the computing device, associating each primary anchor key with a first category of haptic feedback; and in the computing device, associating each secondary anchor key with a second category of haptic feedback; and presenting the first and second categories of haptic feedback associated with the primary and secondary anchor keys on the keyboard layout on the touch screen of the computing device.

13. The computer-readable media of claim 12, wherein the first set of anchor keys is associated with a left hand of a user and the second set of anchor keys is associated with a right hand of the user.

14. The computer-readable media of claim 12, wherein each anchor key is one of a primary anchor key and a secondary anchor key.

15. The computer-readable media of claim 12, wherein each primary anchor key is the anchor key of each set of anchor keys that is closest to the center of the keyboard.

* * * * *